(12) United States Patent
Tseng et al.

(10) Patent No.: US 8,213,524 B2
(45) Date of Patent: Jul. 3, 2012

(54) DTMB-BASED CONTROL SYSTEM AND RECEIVING SYSTEM HAVING THE SAME

(75) Inventors: Chun-Chieh Tseng, Gueishan Township, Taoyuan County (TW); Wei-Cheng Pu, Sindian (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 712 days.

(21) Appl. No.: 12/453,629

(22) Filed: May 18, 2009

(65) Prior Publication Data
US 2009/0296800 A1    Dec. 3, 2009

(30) Foreign Application Priority Data
Jun. 3, 2008   (TW) ................................ 97120589 A

(51) Int. Cl.
*H04L 27/28* (2006.01)
(52) U.S. Cl. ..................................................... 375/260
(58) Field of Classification Search .................. 375/340, 375/316, 260, 341, 342, 343, 346; 714/746, 714/786
See application file for complete search history.

(56) References Cited

U.S. PATENT DOCUMENTS

| | | | |
|---|---|---|---|
| 7,660,928 B2 * | 2/2010 | Satani | 710/244 |
| 2006/0088111 A1 | 4/2006 | Ye et al. | |
| 2008/0025424 A1 * | 1/2008 | Yang et al. | 375/260 |
| 2009/0304062 A1 * | 12/2009 | Tseng et al. | 375/232 |

* cited by examiner

*Primary Examiner* — Khai Tran
(74) *Attorney, Agent, or Firm* — Bacon & Thomas, PLLC

(57) ABSTRACT

A DTMB-based control system includes a carrier mode detector, a TPS decoder, a first latch, a second latch, and a latch controller. The carrier mode detector receives a number of $N_{TPS}$ and $N_{CS}$ of input signals to thereby produce an amplitude sign signal and a carrier sign signal for accordingly determining a carrier mode to be multi- or single-carrier mode. The TPS decoder receives the $N_{TPS}$ input signals and accordingly determines a codeword index signal. The first latch locks the amplitude sign signal and the carrier sign signal. The second latch locks the codeword index signal. The latch controller receives a frame number and drives the first latch to lock the amplitude sign signal and the carrier sign signal or drives the second latch to lock the codeword index signal.

7 Claims, 6 Drawing Sheets

DTMB-BASED CONTROL SYSTEM AND RECEIVING SYSTEM HAVING THE SAME

BACKGROUND OF THE INVENTION

1. Field of the Invention

The present invention relates to the technical field of wireless transmission and, more particularly, to a control system for Digital Terrestrial Multimedia Broadcasting (DTMB) and a receiving system having the same.

2. Description of Related Art

In addition to providing a broadcasting program with better picture and sound qualities and spectral efficiency, the digital television broadcasting can also provide various data services in comparison with the analog television broadcasting.

With the coming digital epoch, the television broadcasting gradually changes from a conventional analog system to a digital system while the mobile communication is developed from the first-generation analog systems to the second-generation voice systems and the third-generation digital multimedia systems. A digital video broadcasting (DVB) system can overcome the problems of poor receiving quality or unstable signal intensity occurred in the current analog systems and caused by the topographies and the obstacles to thereby provide a broadcasting program with better picture and sound qualities. In addition, the spectral efficiency in the DVB system is increased, and the data amount of programs can be broadcasted more in a limited system bandwidth. More importantly, the DVB can provide various additive services derived from the data broadcasting.

The DVB systems currently proposed by certain nations can be divided into multi-carrier mode and single-carrier mode. The former mostly uses the Orthogonal Frequency Division Multiplexing (OFDM) modulation technique. In the broadcasting systems, the receiving and decoding functions of Transmission Parameter Signaling (TPS) are important.

As an example of the Terrestrial Digital Video Broadcasting (DVB-T) of European standard, the transmission modes include 2k and 8k modes. For the 2k mode, each OFDM symbol includes 2048 subcarriers, but in application only 1705 subcarriers are used and the remaining ones that are close to two sides of the channel are reserved as a guard band. Among the 1705 subcarriers, only 1512 ones are used to transmit the Quadrature Amplitude Modulation (QAM) signals, and the remaining 193 ones are used to transmit the pilot signals. The pilot signals include 17 TPS pilots, 45 continual pilots and 131 scattered pilots.

Similarly, for the 8k mode, each OFDM symbol includes 8192 subcarriers, but in application only 6817 ones are active. Only 6048 ones among the 6817 subcarriers are active to transmit the QAM signals, and the remaining 769 ones are active to transmit the pilot signals. The pilot signals include 68 TPS pilots, 177 continual pilots and 524 scattered pilots.

The TPS pilots in the DVB-T system transmit the synchronization signal and the transmission-associated parameters such as coding rates (½, ⅔, ¾, ⅚, ⅞), QAM modulation modes (Quadrature Phase Shift Keying (QPSK), 16-QAM, 64-QAM), guard interval lengths (¼ TU, ⅛ TU, $\frac{1}{16}$ TU, $\frac{1}{32}$ TU), transmission modes (2k, 8k), and the like. Accordingly, the receiver may accurately decode the TPS pilots in advance, so as to ensure that the subsequently received data can be accurately decoded.

US Patent Publication No. 2006/0088111 has disclosed the channel state information (CSI) to help decoding the TPS. As shown in the block diagram of FIG. 1, a Viterbi input processor 76 provides the CSI and outputs the CSI to a TPS decoder 66 for decoding. However, it does not disclose how to use the CSI and the input signals to obtain the best TPS decoding function, how to properly and effectively design the system to obtain the best TPS decoding function with the use of an equalizer, and how to determine a carrier mode and associated control method.

Therefore, it is desirable to provide an improved control system to mitigate and/or obviate the aforementioned problems.

SUMMARY OF THE INVENTION

The object of the present invention is to provide a Digital Terrestrial Multimedia Broadcasting (DTMB)-based control system and a receiving system having the same, which can obtain the accurate carrier mode and the best TPS decoding function.

According to a feature of the invention, a Digital Terrestrial Multimedia Broadcasting (DTMB)-based control system is provided. The control system includes a carrier mode detector, a Transmission Parameter Signaling (TPS) decoder, a first latch, a second latch and a latch controller. The carrier mode detector receives a number of $N_{TPS}$ and $N_{CS}$ of input signals to thereby produce an amplitude sign signal and a carrier sign signal and determines a carrier mode to be multi- or single-carrier mode based on the amplitude sign signal and the carrier sign signal, where $N_{TPS}$ indicates the number of TPS signals of an i-th frame in wireless transmission, $N_{CS}$ indicates the number of carrier signals of the i-th frame, and $N_{TPS}$, $N_{CS}$ and i are a positive integer. The TPS decoder receives the $N_{TPS}$ input signals and determines a codeword index signal corresponding to the $N_{TPS}$ input signals. The first latch is connected to the carrier mode detector in order to lock the amplitude sign signal and the carrier sign signal. The second latch is connected to the TPS decoder in order to lock the codeword index signal. The latch controller is connected to the carrier mode detector, the TPS decoder, the first latch and the second latch in order to receive a frame number to thereby drive the first latch to lock the amplitude sign signal and the carrier sign signal or drive the second latch to lock the codeword index signal.

According to another feature of the invention, a receiving system for Digital Terrestrial Multimedia Broadcasting (DTMB) is provided. The receiving system includes an antenna, a radio frequency (RF) front end, an analog to digital converter (ADC), a filter, a synchronizer, a channel estimator, a frame body processor, a 3780-dot Fast Fourier Transform (FFT), a single tap equalizer, a 3780-dot inverse Fast Fourier Transform (IFFT) and a control system. The antenna receives a radio signal. The RF front end is connected to the antenna in order to reduce the radio signal from a radio frequency down to a baseband to thereby produce a baseband signal. The ADC is connected to the RF front end in order to perform an analog to digital conversion on the baseband signal to thereby produce an in-phase part and a quadrature-phase part. The filter is connected to the ADC in order to perform a filtering on the in-phase part and the quadrature-phase part to thereby filter outband noises and produce a filtering signal. The synchronizer is connected to the filter in order to perform a system synchronization based on the filtering signal. The channel estimator is connected to the filter in order to perform a channel measurement on a transmission channel to thereby produce a channel measure signal. The frame body processor is connected to the filter and the channel estimator in order to perform a frame body processing based on the channel measure signal produced by the channel estimator to thereby eliminate an interference caused by a frame header and produce a circular convolution of the frame body and the channel measure signal. The 3780-dot FFT is connected to the frame body processor in order to perform an FFT operation on an output of the frame body processor to thereby produce an unequalized frequency domain input signal. The single tap equalizer is connected to the 3780-dot FFT in order to perform a zero-forcing equalization processing on the unequalized frequency domain input signal to thereby produce a frequency domain input signal. The 3780-dot IFFT performs an IFFT operation on the frequency domain input signal to thereby produce a time domain input signal. The control system is connected to the single tap equalizer and the 3780-dot IFFT in order to lock and output an amplitude sign signal, a carrier sign signal and a codeword index signal based on the time or frequency domain input signal to thereby obtain an accurate carrier mode and a best TPS decoding function.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
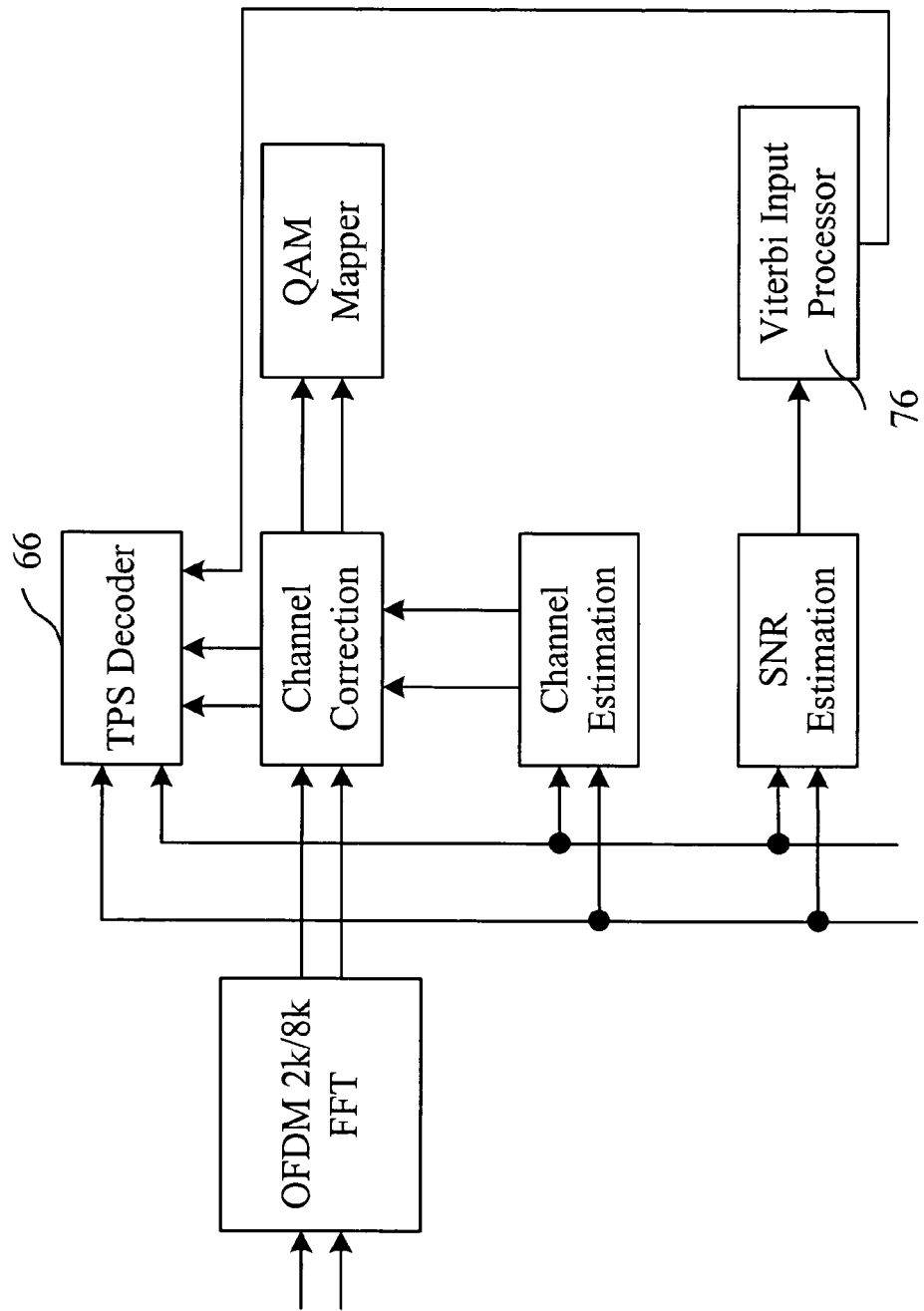
FIG. 1 is a schematic diagram of a typical TPS decoding.
Figure 2:
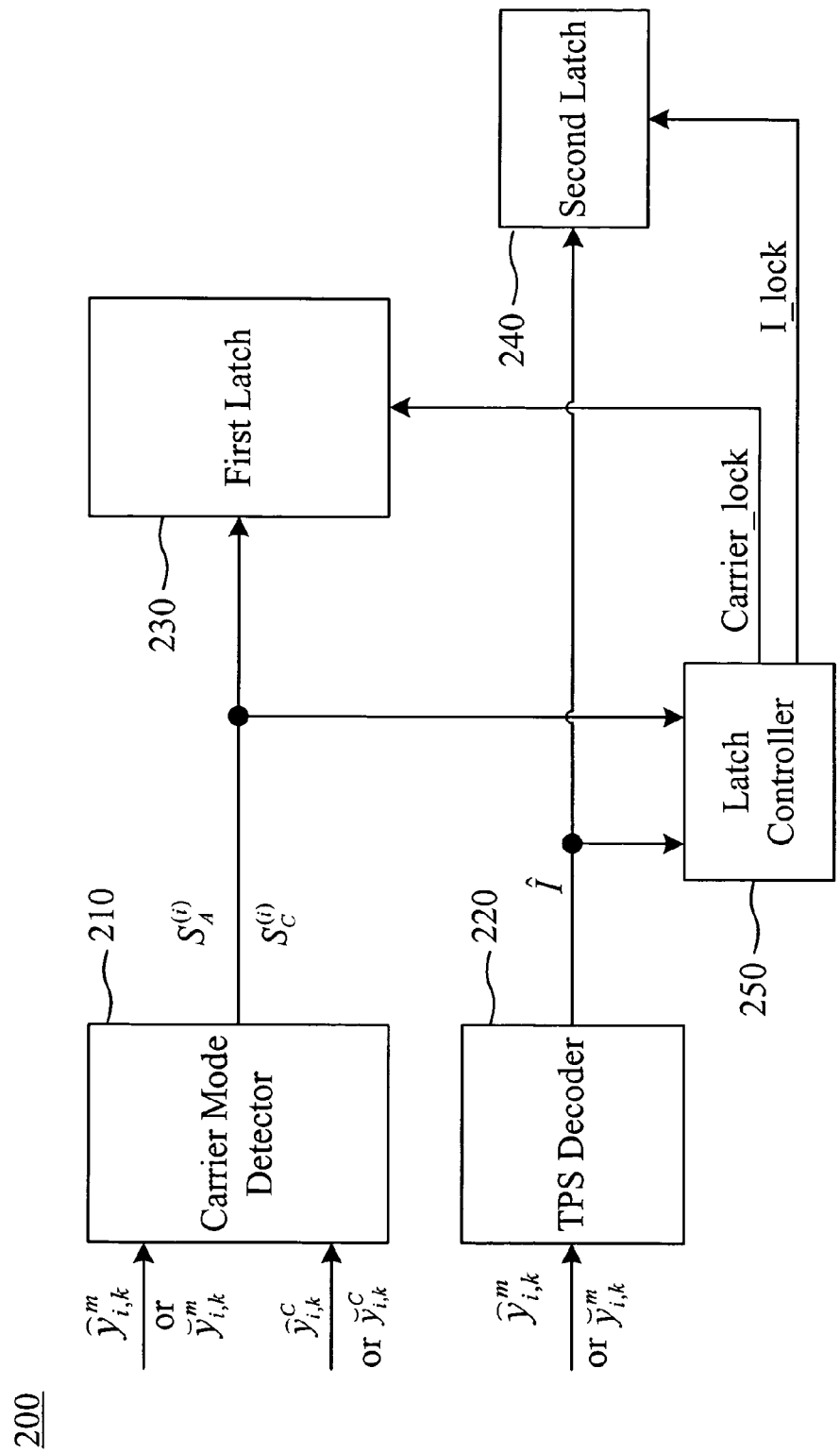
FIG. 2 is a block diagram of a DTMB-based control system according to the invention.

FIG. 2 is a block diagram of a DTMB-based control system. In FIG. 2, the control system 200 includes a carrier mode detector 210, a Transmission Parameter Signaling (TPS) decoder 220, a first latch 230, a second latch 240 and a latch controller 250.

The carrier mode detector 210 receives a number of $N_{TPS}$ and $N_{CS}$ of input signals to thereby produce an amplitude sign signal $S_A^{(i)}$ and a carrier sign signal $S_C^{(i)}$ and determines the carrier mode to be multi-carrier mode or single-carrier mode based on the amplitude sign signal $S_A^{(i)}$ and the carrier sign signal $S_C^{(i)}$, where $N_{TPS}$ indicates the number of TPS signals of the i-th frame in wireless transmission, $N_{CS}$ indicates the number of carrier signals of the i-th frame, and $N_{TPS}$, $N_{CS}$ and i are positive integers. The $N_{TPS}$ input signals can be time domain input signals $\check{y}_{i,k}^m$ or frequency domain input signals $\hat{y}_{i,k}^m$, and the $N_{CS}$ input signals can be time domain input signals $\check{y}_{i,k}^C$ or frequency domain input signals $\hat{y}_{i,k}^C$.

The TPS decoder 220 receives the $N_{TPS}$ input signals $\check{y}_{i,k}^m$ or $\hat{y}_{i,k}^m$ and determines a codeword index signal $\hat{I}$ corresponding to the input signals $\check{y}_{i,k}^m$ or $\hat{y}_{i,k}^m$.

The first latch 230 is connected to the carrier mode detector 210 in order to lock the amplitude sign signal $S_A^{(i)}$ and the carrier sign signal $S_C^{(i)}$.

The second latch 240 is connected to the TPS decoder 220 in order to lock the codeword index signal $\hat{I}$.

The latch controller 250 is connected to the carrier mode detector 210, the TPS decoder 220, the first latch 230 and the second latch 240 in order to drive the first latch to lock the amplitude sign signal $S_A^{(i)}$ and the carrier sign signal $S_C^{(i)}$ or drive the second latch 240 to lock the codeword index signal $\hat{I}$.

Figure 3:
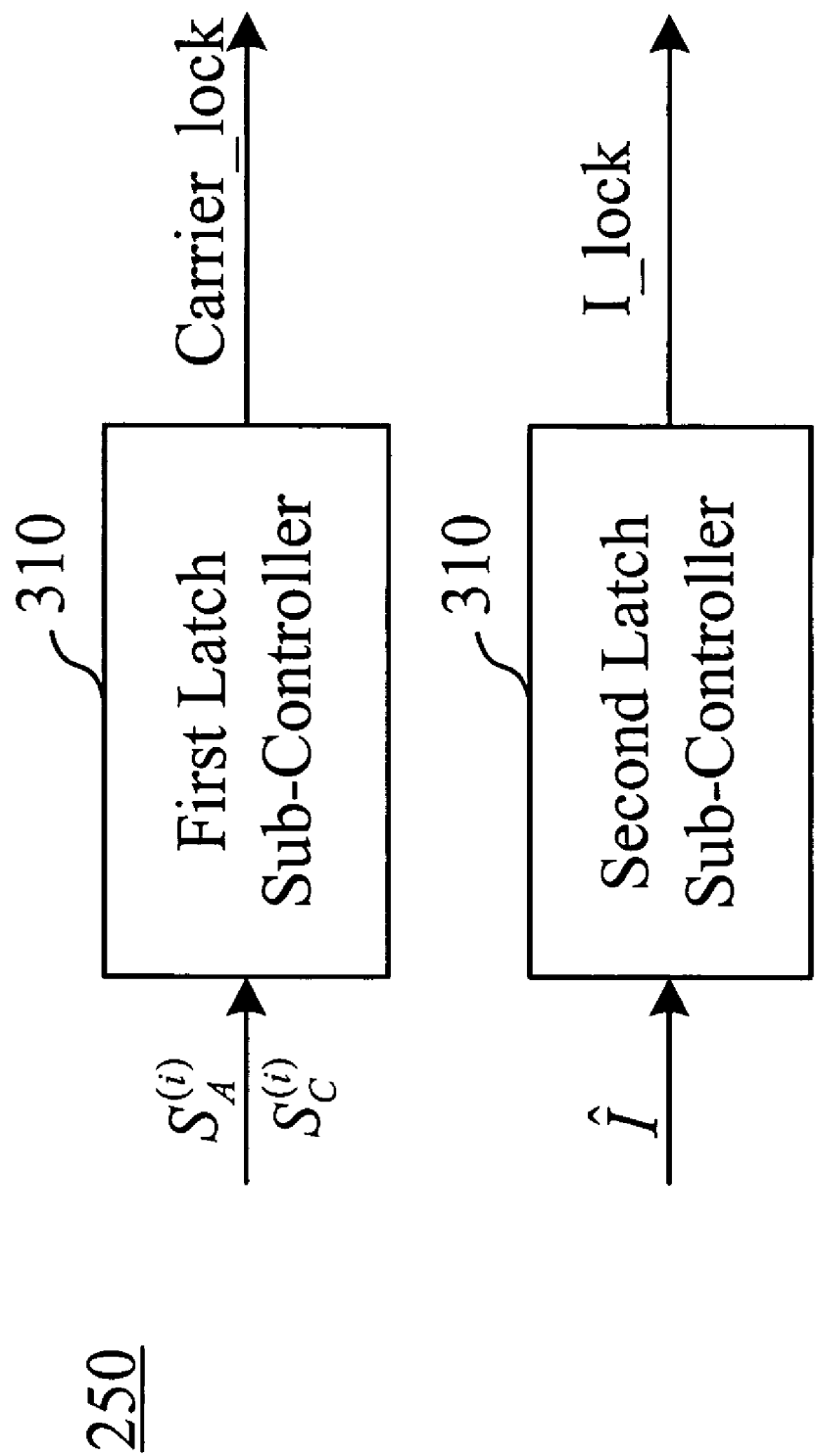
FIG. 3 is a block diagram of a latch controller according to the invention.

FIG. 3 is a block diagram of the latch controller 250 according to the invention. In FIG. 3, the latch controller 250 includes a first latch sub-controller 310 and a second latch sub-controller 320. The first latch sub-controller 310 is connected to the carrier mode detector 210 in order to receive and drive the amplitude sign signal $S_A^{(i)}$ and the carrier sign signal $S_C^{(i)}$. The second latch sub-controller 320 is connected to the TPS decoder 220 in order to receive and drive the codeword index signal $\hat{I}$.

Figure 4:
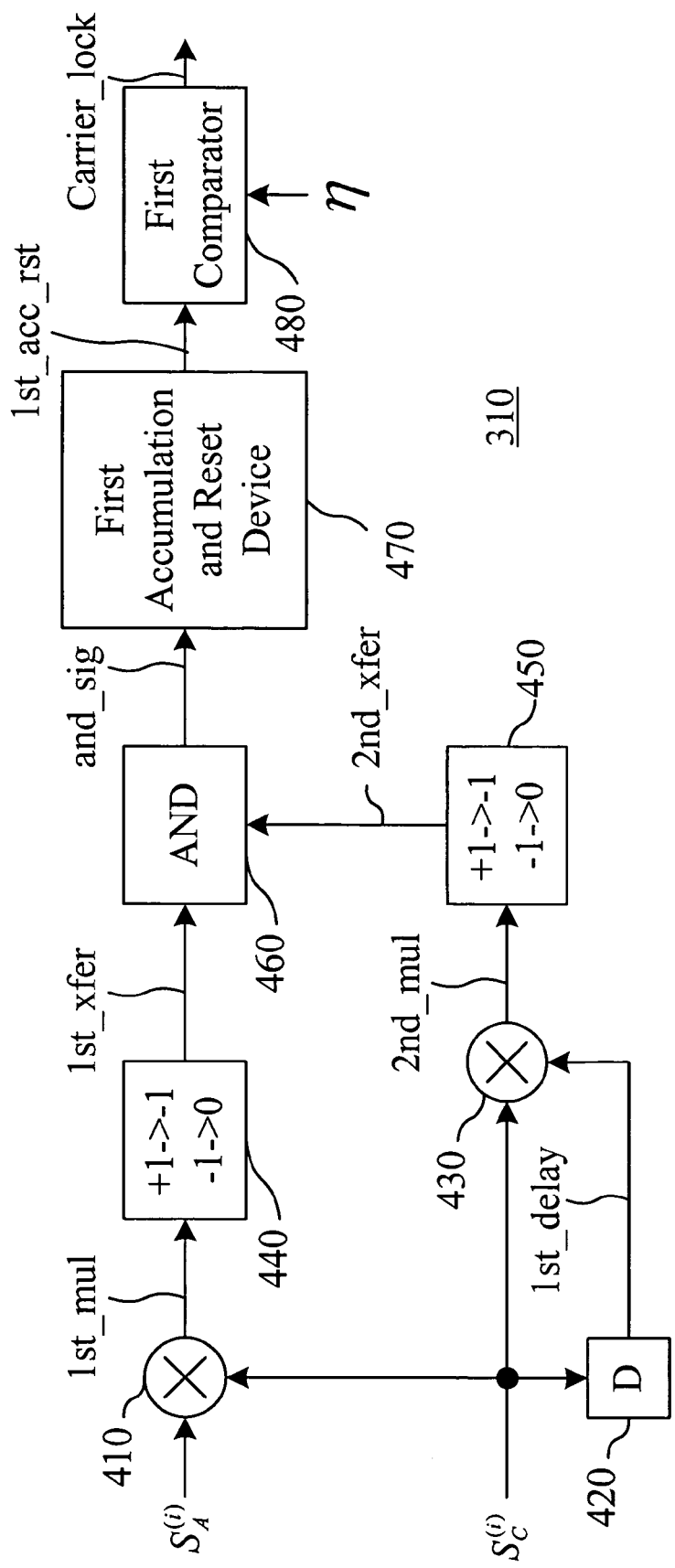
FIG. 4 is a block diagram of a first latch sub-controller according to the invention.

FIG. 4 is a block diagram of the first latch sub-controller 310 according to the invention. In FIG. 4, the first latch sub-controller 310 includes a first multiplier 410, a first delay 420, a second multiplier 430, a first converter 440, a second converter 450, an AND gate 460, a first accumulation and reset device 470 and a first comparator 480.

The first multiplier 410 receives the amplitude sign signal $S_A^{(i)}$ and the carrier sign signal $S_C^{(i)}$ to thereby produce a first multiplication signal 1st_mul.

The first delay 420 receives the carrier sign signal $S_{C(i)}$ to thereby produce a first delay signal 1st_delay.

The second multiplier 430 receives the carrier sign signal $S_C^{(i)}$ and the first delay signal 1st_delay to thereby produce a second multiplication signal 2nd_mul.

The first converter 440 is connected to the first multiplier 410 in order to convert the first multiplication signal 1st_mul into a first conversion signal 1st_xfer.

The second converter 450 is connected to the second multiplier 420 in order to convert the second multiplication signal 2nd_mul into a second conversion signal 2nd_xfer.

The first converter 440 and the second converter 450 convert "+1" into "1" and "−1" into "0", where "1" indicates the high potential and "0" indicates the low potential. Namely, when the first conversion signal 1st_xfer is "1", it indicates that the amplitude sign signal $S_A^{(i)}$ and the carrier sign signal $S_C^{(i)}$ have the same sign. When the second conversion signal 2nd_xfer is "1", it indicates that the carrier sign signal $S_C^{(i)}$ has a sign as same as the carrier sign signal $S_C^{(i-1)}$ corresponding to the immediately previous frame.

The AND gate 460 is connected to the first converter 440 and the second converter 450 in order to perform an AND operation on the first conversion signal 1st_xfer and the second conversion signal 2nd_xfer to thereby produce an AND signal and_sig.

The first accumulation and reset device 470 connected to the AND gate 460 outputs a first accumulation and reset signal 1st_acc_rst. When the AND signal and_sig indicates the high potential, the first accumulation and reset device 470 accumulates the first accumulation and reset signal 1st_acc_rst. When the AND signal and_sig indicates the low potential, the first accumulation and reset device 470 resets the first accumulation and reset signal 1st_acc_rst to the low potential. Namely, the first accumulation and reset device 470 accumulates the first accumulation and reset signal 1st_acc_rst when the carrier sign signal $S_C^{(i)}$ has a sign as same as the amplitude sign signal $S_A^{(i)}$ and the carrier sign signal $S_C^{(i-1)}$, and otherwise it resets the first accumulation and reset signal 1st_acc_rst to the low potential.

The first comparator 480 is connected to the first accumulation and reset device 470 in order to drive the first latch 230 to lock the amplitude sign signal $S_A^{(i)}$ and the carrier sign signal $S_C^{(i-1)}$ when the first accumulation and reset signal 1st_acc_rst is greater than a threshold η, which indicates that in multiple frames the amplitude sign signal $S_A^{(i)}$ and the carrier sign signal $S_C^{(i)}$ have the same sign and also the carrier sign signal $S_C^{(i)}$ has a sign as same as the carrier sign signal $S_C^{(i-1)}$. Namely, the amplitude sign signal $S_A^{(i)}$ and the carrier sign signal $S_C^{(i)}$ outputted by the carrier mode detector 210 are stable, and in this case the first comparator 480 drives the first latch 230 to lock the amplitude sign signal $S_A^{(i)}$ and the carrier sign signal $S_C^{(i)}$.

Figure 5:
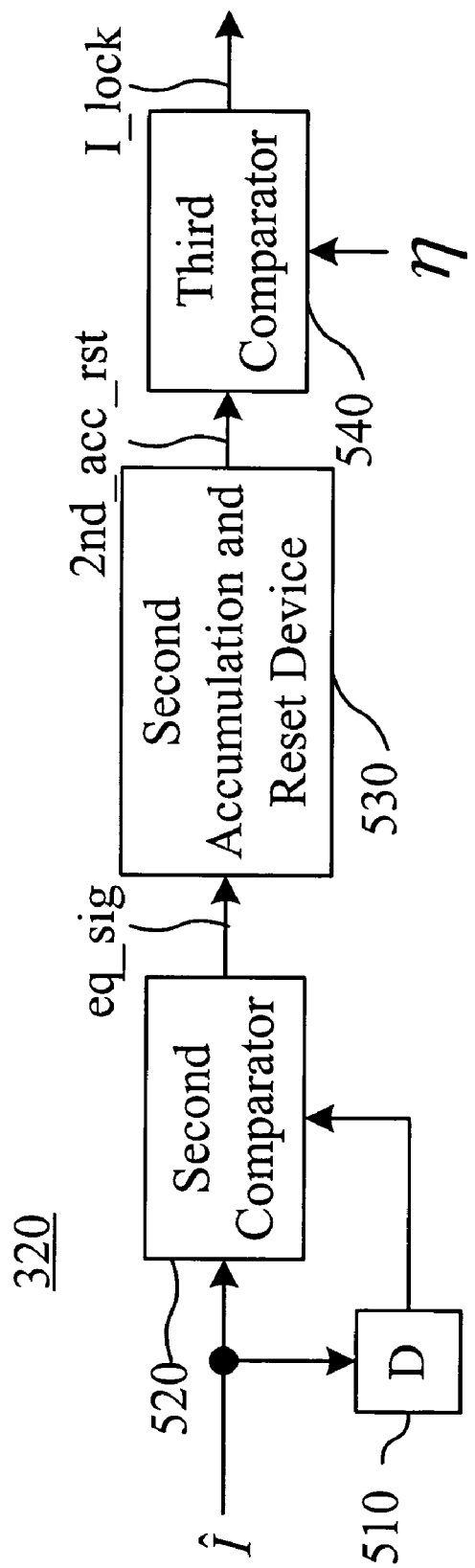
FIG. 5 is a block diagram of a second latch sub-controller according to the invention.

FIG. 5 is a block diagram of the second latch sub-controller 320 according to the invention. In FIG. 5, the second latch sub-controller 320 includes a second delay 510, a second comparator 520, a second accumulation and reset device 530 and a third comparator 540.

The second delay 510 receives the codeword index signal Î of the i-th frame and outputs the codeword index signal Î of the (i−1)-th frame.

The second comparator 520 connected to the second delay 510 outputs an equal signal eq_sig. When the i-th frame and the (i−1)-th frame have the same codeword index signal Î, the equal signal eq_sig indicates the high potential, and otherwise the low potential.

The second accumulation and reset device 530 connected to the second comparator 520 outputs a second accumulation and reset signal 2nd_acc_rst. When the equal signal eq_sig indicates the high potential, the second accumulation and reset device 530 accumulates the second accumulation and reset signal 2nd_acc_rst. When the equal signal eq_sig indicates the low potential, the second accumulation and reset device 530 resets the second accumulation and reset signal 2nd_acc_rst to the low potential. Namely, when the codeword index signals of the i-th frame and the (i−1)-th frame are the same, the second accumulation and reset device 530 accumulates the second accumulation and reset signal 2nd_acc_rst, and otherwise it resets the signal 2nd_acc_rst to the low potential.

The third comparator 540 is connected to the second accumulation and reset device 530 in order to drive the second latch 240 to lock the codeword index signal Î of the i-th frame when the second accumulation and reset signal 2nd_acc_rst is greater than the threshold η, which indicates that the codeword index signals Î corresponding to multiple frames are the same. Namely, the codeword index signal Î outputted by the TPS decoder 220 is stable, and in this case the third comparator 540 drives the second latch 240 to lock the codeword index signal Î.

Figure 6:
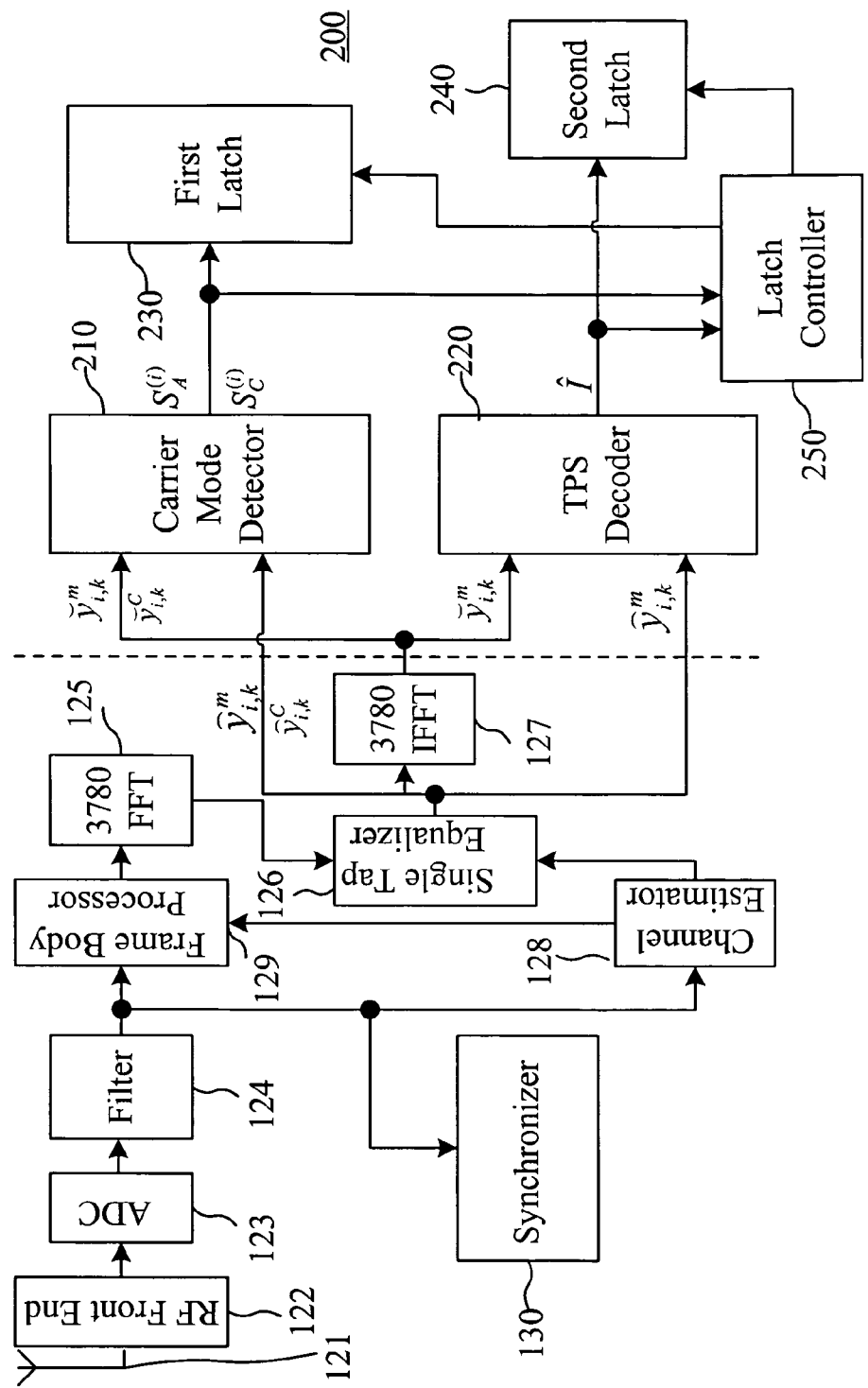
FIG. 6 is a schematic diagram of a control system applied to a receiver of a DTMB digital television system according to the invention.

FIG. 6 is a schematic diagram of the control system 200 applied to a receiver of a DTMB digital television system according to the invention. As shown in FIG. 6, the control system 200 is shown at the right side of the dotted line, and the receiver of the DTMB digital television system is shown at the left side of the dotted line. The receiver includes an antenna 121, a radio frequency (RF) front end 122, an analog to digital converter (ADC) 123, a filter 124, a frame body processor 129, a synchronizer 130, a 3780-dot Fast Fourier Transform (FFT) 125, a single tap equalizer 126, a 3780-dot inverse Fast Fourier Transform (IFFT) 127 and a channel estimator 128.

The antenna 121 receives a radio signal. The RF front end 122 reduces the radio signal from a radio frequency down to a baseband to thereby produce a baseband signal. The ADC 123 performs an analog to digital conversion on the baseband signal to thereby produce an in-phase part I and a quadrature-phase part Q. The filter 124 performs a filtering on the in-phase part I and the quadrature-phase part Q to thereby filter outband noises. The synchronizer 130 is connected to an output of the filter for system synchronization. The channel estimator 128 is connected to the output of the filter for channel measurement to thereby produce a channel measure signal $\{\hat{H}_{i,k}\}$. The frame body processor 129 is based on the channel measure signal produced by the channel estimator 128 to perform the frame body processing, which includes eliminating the interference caused by the frame header and producing the circular convolution of the frame body and the estimated channel. The 3780-dot FFT 125 performs an FFT operation on an output of the frame body processor 129 to thereby produce an unequalized frequency domain input signal $\{y_{i,k}^m\}$. The single tap equalizer 126 is based on the channel measure signal $\{\hat{H}_{i,k}\}$ to perform a zero-forcing equalization processing on the unequalized frequency domain input signal $\{y_{i,k}^m\}$ to thereby produce a frequency domain input signal $\hat{y}_{i,k}^m$ or $\hat{y}_{i,k}^C$ used in the control system 200. The 3780-dot IFFT 127 performs an IFFT operation on the frequency domain input signal $\hat{y}_{i,k}^m$ or $\hat{y}_{i,k}^C$ to thereby produce a time domain input signal $\breve{y}_{i,k}^m$ or $\breve{y}_{i,k}^C$.

Since a signal transmitted by a wireless channel may be affected by the noises, interferences and/or multi-path fading, it sometimes causes the carrier mode detector 210 and the TPS decoder 220 to present a decoding mistake. To overcome this, when the TPS decoder successively outputs the same codeword index signal Î many times, the latch controller 250 drives the second latch 240 to lock the codeword index signal Î. In addition, when the carrier mode detector 210 successively outputs the amplitude sign signal $S_A^{(i)}$ and the carrier sign signal $S_C^{(i)}$ of the same sign many times, the latch controller 250 drives the first latch 230 to lock the amplitude sign signal $S_A^{(i)}$ and the carrier sign signal $S_C^{(i)}$. Thus, the system reliability is relatively increased.

As cited, the prior art does not disclose how to obtain an accurate carrier mode by the carrier mode detector of the DTMB system and how to obtain an accurate codeword index signal by the TPS decoder of the DTMB system. However, the invention increases the system reliability by determining whether plural outputs of the carrier mode detector or the TPS decoder are the same. Similarly, the invention further determines whether the TPS and the carrier mode are stably outputted after decoding and latches the outputs at stable.

Although the present invention has been explained in relation to its preferred embodiment, it is to be understood that many other possible modifications and variations can be made without departing from the spirit and scope of the invention as hereinafter claimed.

What is claimed is:

1. A Digital Terrestrial Multimedia Broadcasting (DTMB)-based control system, comprising:

a carrier mode detector, for receiving (M+N) input signals to thereby produce an amplitude sign signal and a carrier sign signal and determining a carrier mode to be multi-carrier mode or single-carrier mode based on the amplitude sign signal and the carrier sign signal, where M indicates the number of TPS signals corresponding to the i-th frame in wireless transmission, N indicates the number of carrier signals corresponding to the i-th frame;

a TPS decoder, for receiving the M input signals and determining a codeword index signal corresponding to the M input signals;

a first latch, connected to the carrier mode detector, for locking the amplitude sign signal and the carrier sign signal;

a second latch, connected to the TPS decoder, for locking the codeword index signal; and a latch controller, connected to the carrier mode detector, the TPS decoder, the first latch and the second latch, for driving the first latch to lock the amplitude sign signal and the carrier sign signal or driving the second latch to lock the codeword index signal.

2. The control system as claimed in claim 1, wherein the latch controller comprises a first latch sub-controller including:
a first multiplier, for receiving the amplitude sign signal and the carrier sign signal to thereby produce a first multiplication signal;
a first delay, for receiving the carrier sign signal to thereby produce a first delay signal;
a second multiplier, for receiving the carrier sign signal and the first delay signal to thereby produce a second multiplication signal;
a first converter, connected to the first multiplier, for converting the first multiplication signal into a first conversion signal;
a second converter, connected to the second multiplier for converting the second multiplication signal into a second conversion signal;
an AND gate, connected to the first converter and the second converter, for performing an AND operation on the first and the second conversion signals to thereby produce an AND signal;
a first accumulation and reset device, connected to the AND gate, for outputting a first accumulation and reset signal, wherein the first accumulation and reset device accumulates the first accumulation and reset signal when the AND signal indicates a high potential and resets the first accumulation and reset signal to a low potential when the AND signal indicates the low potential;
a first comparator, connected to the first accumulation and reset device, for driving the first latch to lock the amplitude sign signal and the carrier sign signal when the first accumulation and reset signal is greater than a threshold.

3. The control system as claimed in claim 2, wherein the latch controller further comprises a second latch sub-controller including:
a second delay, for receiving the codeword index signal of i-th frame and outputting the codeword index signal of (i−1)-th frame.
a second comparator, connected to the second delay, to thereby output an equal signal, wherein the equal signal indicates the high potential when the codeword index signals of the i-th frame and the (i−1)-th frame are the same, and otherwise the equal signal indicates the low potential;
a second accumulation and reset device, connected to the second comparator, to thereby output a second accumulation and reset signal, wherein the second accumulation and reset device accumulates the second accumulation and reset signal when the equal signal indicates the high potential, and resets the second accumulation and reset signal to the low potential when the equal signal indicates the low potential;
a third comparator, connected to the second accumulation and reset device, for driving the second latch to lock the codeword index signal of the i-th frame when the second accumulation and reset signal is greater than the threshold.

4. The control system as claimed in claim 2, wherein the first converter and the second converter convert "+1" into "1" and "−1" into "0", where "1" corresponds to the high potential and "0" corresponds to the low potential.

5. The control system as claimed in claim 4, wherein the (M+N) input signals are frequency domain signals or time domain signals.

6. The control system as claimed in claim 1, wherein M=32 and N=4.

7. The control system as claimed in claim 1, wherein the control system is applied to a receiving system, the receiving system comprising:
an antenna, for receiving a radio signal;
a radio frequency (RF) front end, connected to the antenna, for reducing the radio signal from a radio frequency down to a baseband to thereby produce a baseband signal;
an analog to digital converter (ADC), connected to the RF front end, for performing an analog to digital conversion on the baseband signal to thereby produce an in-phase part and a quadrature-phase part;
a filter, connected to the ADC, for performing a filtering on the in-phase part and the quadrature-phase part to thereby filter outband noises and produce a filtering signal;
a synchronizer, connected to the filter, for performing a system synchronization based on the filtering signal;
a channel estimator, connected to the filter, for performing a channel measurement on a transmission channel to thereby produce a channel measure signal;
a frame body processor, connected to the filter and the channel estimator, for performing a frame body processing based on the channel measure signal produced by the channel estimator to thereby eliminate an interference caused by a frame header and produce a circular convolution of the frame body and the channel measure signal;
a 3780-dot Fast Fourier Transform (FFT), connected to the frame body processor, for performing an FFT operation on an output of the frame body processor to thereby produce an unequalized frequency domain input signal;
a single tap equalizer, connected to the 3780-dot FFT, for performing a zero-forcing equalization processing on the unequalized frequency domain input signal to thereby produce a frequency domain input signal; and
a 3780-dot inverse FFT (IFFT), for performing an IFFT operation on the frequency domain input signal to thereby produce a time domain input signal;
wherein the control system connected to the single tap equalizer and the 3780-dot IFFT, in order to lock and output the amplitude sign signal, the carrier sign signal and the codeword index signal based on time domain input signal or frequency domain input signal to thereby determine the carrier mode.

* * * * *